(12) United States Patent
Nathan et al.

(10) Patent No.: US 10,078,984 B2
(45) Date of Patent: Sep. 18, 2018

(54) DRIVING CIRCUIT FOR CURRENT PROGRAMMED ORGANIC LIGHT-EMITTING DIODE DISPLAYS

(75) Inventors: Arokia Nathan, Waterloo (CA); Gholamreza Chaji, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 1270 days.

(21) Appl. No.: 11/350,610

(22) Filed: Feb. 9, 2006

(65) Prior Publication Data

US 2006/0208961 A1    Sep. 21, 2006

(30) Foreign Application Priority Data

Feb. 10, 2005    (CA) .................................... 2496642

(51) Int. Cl.
| | |
|---|---|
| G09G 3/30 | (2006.01) |
| G09G 3/3283 | (2016.01) |
| H05B 33/08 | (2006.01) |
| G09G 3/3241 | (2016.01) |

(52) U.S. Cl.
CPC ........... *G09G 3/3283* (2013.01); *H05B 33/08* (2013.01); *G09G 3/3241* (2013.01); *G09G 2310/0248* (2013.01); *G09G 2320/0252* (2013.01); *G09G 2320/0295* (2013.01); *G09G 2330/06* (2013.01)

(58) Field of Classification Search
CPC .. G09G 3/3208; G09G 3/3216; G09G 3/3225; G09G 3/3233; G09G 3/3241; G09G 3/3275; G09G 3/30; G09G 3/32; G09G 3/3283; G09G 3/3291
USPC .............................. 345/44, 76–83; 315/169.3
See application file for complete search history.

(56) References Cited

U.S. PATENT DOCUMENTS

| | | | |
|---|---|---|---|
| 3,506,851 A | 4/1970 | Polkinghorn et al. | |
| 3,774,055 A | 11/1973 | Bapat et al. | |
| 4,090,096 A | 5/1978 | Nagami | |
| 4,160,934 A | 7/1979 | Kirsch | |
| 4,354,162 A | 10/1982 | Wright | |
| 4,617,555 A * | 10/1986 | Sheiman | 340/531 |
| 4,943,956 A | 7/1990 | Noro | |
| 4,996,523 A | 2/1991 | Bell et al. | |
| 5,153,420 A | 10/1992 | Hack et al. | |

(Continued)

FOREIGN PATENT DOCUMENTS

| | | |
|---|---|---|
| CA | 1 294 034 | 1/1992 |
| CA | 2 109 951 | 11/1992 |

(Continued)

OTHER PUBLICATIONS

Ahnood et al.: "Effect of threshold voltage instability on field effect mobility in thin film transistors deduced from constant current measurements"; dated Aug. 2009.

(Continued)

*Primary Examiner* — Alexander Eisen
*Assistant Examiner* — Nelson Lam
(74) *Attorney, Agent, or Firm* — Nixon Peabody LLP

(57) ABSTRACT

A load driving circuit for a load having a parasitic capacitance associated therewith is provided. The load being current programmed. The driving circuit has a data line having a voltage controlling the load, a feedback loop having a lowpass filter for monitoring the voltage of the data line; and a current source for providing a current to the data line; the current source being controlled by a signal line and an output from the lowpass filter.

8 Claims, 10 Drawing Sheets

(56) References Cited

U.S. PATENT DOCUMENTS

| | | | |
|---|---|---|---|
| 5,198,803 A | 3/1993 | Shie et al. | |
| 5,204,661 A | 4/1993 | Hack et al. | |
| 5,266,515 A | 11/1993 | Robb et al. | |
| 5,489,918 A | 2/1996 | Mosier | |
| 5,498,880 A | 3/1996 | Lee et al. | |
| 5,572,444 A | 11/1996 | Lentz et al. | |
| 5,589,847 A | 12/1996 | Lewis | |
| 5,619,033 A | 4/1997 | Weisfield | |
| 5,648,276 A | 7/1997 | Hara et al. | |
| 5,670,973 A | 9/1997 | Bassetti et al. | |
| 5,691,783 A | 11/1997 | Numao et al. | |
| 5,714,968 A | 2/1998 | Ikeda | |
| 5,723,950 A * | 3/1998 | Wei et al. | 315/169.3 |
| 5,744,824 A | 4/1998 | Kousai et al. | |
| 5,745,660 A | 4/1998 | Kolpatzik et al. | |
| 5,748,160 A | 5/1998 | Shieh et al. | |
| 5,815,303 A | 9/1998 | Berlin | |
| 5,870,071 A | 2/1999 | Kawahata | |
| 5,874,803 A | 2/1999 | Garbuzov et al. | |
| 5,880,582 A | 3/1999 | Sawada | |
| 5,903,248 A | 5/1999 | Irwin | |
| 5,917,280 A | 6/1999 | Burrows et al. | |
| 5,923,794 A | 7/1999 | McGrath et al. | |
| 5,945,972 A | 8/1999 | Okumura et al. | |
| 5,949,398 A | 9/1999 | Kim | |
| 5,952,789 A | 9/1999 | Stewart et al. | |
| 5,952,991 A | 9/1999 | Akiyama et al. | |
| 5,982,104 A | 11/1999 | Sasaki et al. | |
| 5,990,629 A | 11/1999 | Yamada et al. | |
| 6,023,259 A | 2/2000 | Howard et al. | |
| 6,069,365 A | 5/2000 | Chow et al. | |
| 6,091,203 A | 7/2000 | Kawashima et al. | |
| 6,097,360 A | 8/2000 | Holloman | |
| 6,144,222 A | 11/2000 | Ho | |
| 6,177,915 B1 | 1/2001 | Beeteson et al. | |
| 6,229,506 B1 | 5/2001 | Dawson et al. | |
| 6,229,508 B1 | 5/2001 | Kane | |
| 6,246,180 B1 | 6/2001 | Nishigaki | |
| 6,252,248 B1 | 6/2001 | Sano et al. | |
| 6,259,424 B1 | 7/2001 | Kurogane | |
| 6,262,589 B1 | 7/2001 | Tamukai | |
| 6,271,825 B1 | 8/2001 | Greene et al. | |
| 6,288,696 B1 | 9/2001 | Holloman | |
| 6,304,039 B1 | 10/2001 | Appelberg et al. | |
| 6,307,322 B1 | 10/2001 | Dawson et al. | |
| 6,310,962 B1 | 10/2001 | Chung et al. | |
| 6,320,325 B1 | 11/2001 | Cok et al. | |
| 6,323,631 B1 | 11/2001 | Juang | |
| 6,356,029 B1 | 3/2002 | Hunter | |
| 6,373,454 B1 | 4/2002 | Knapp et al. | |
| 6,392,617 B1 | 5/2002 | Gleason | |
| 6,414,661 B1 | 7/2002 | Shen et al. | |
| 6,417,825 B1 | 7/2002 | Stewart et al. | |
| 6,433,488 B1 * | 8/2002 | Bu | 315/169.3 |
| 6,437,106 B1 | 8/2002 | Stoner et al. | |
| 6,445,369 B1 * | 9/2002 | Yang et al. | 345/82 |
| 6,475,845 B2 | 11/2002 | Kimura | |
| 6,501,098 B2 | 12/2002 | Yamazaki | |
| 6,501,466 B1 | 12/2002 | Yamagishi et al. | |
| 6,522,315 B2 | 2/2003 | Ozawa et al. | |
| 6,525,683 B1 | 2/2003 | Gu | |
| 6,531,827 B2 | 3/2003 | Kawashima | |
| 6,542,138 B1 | 4/2003 | Shannon et al. | |
| 6,580,408 B1 | 6/2003 | Bae et al. | |
| 6,580,657 B2 | 6/2003 | Sanford et al. | |
| 6,583,398 B2 | 6/2003 | Harkin | |
| 6,583,775 B1 | 6/2003 | Sekiya et al. | |
| 6,594,606 B2 | 7/2003 | Everitt | |
| 6,618,030 B2 | 9/2003 | Kane et al. | |
| 6,618,097 B1 * | 9/2003 | Yamada | 348/625 |
| 6,639,244 B1 | 10/2003 | Yamazaki et al. | |
| 6,668,645 B1 | 12/2003 | Gilmour et al. | |
| 6,677,713 B1 | 1/2004 | Sung | |
| 6,680,580 B1 | 1/2004 | Sung | |
| 6,687,266 B1 | 2/2004 | Ma et al. | |
| 6,690,000 B1 | 2/2004 | Muramatsu et al. | |
| 6,690,344 B1 | 2/2004 | Takeuchi et al. | |
| 6,693,388 B2 | 2/2004 | Oomura | |
| 6,693,610 B2 | 2/2004 | Shannon et al. | |
| 6,697,057 B2 | 2/2004 | Koyama et al. | |
| 6,720,942 B2 | 4/2004 | Lee et al. | |
| 6,724,151 B2 | 4/2004 | Yoo | |
| 6,734,636 B2 | 5/2004 | Sanford et al. | |
| 6,738,034 B2 | 5/2004 | Kaneko et al. | |
| 6,738,035 B1 | 5/2004 | Fan | |
| 6,753,655 B2 | 6/2004 | Shih et al. | |
| 6,753,834 B2 | 6/2004 | Mikami et al. | |
| 6,756,741 B2 | 6/2004 | Li | |
| 6,756,952 B1 | 6/2004 | Decaux et al. | |
| 6,756,985 B1 | 6/2004 | Furuhashi et al. | |
| 6,771,028 B1 | 8/2004 | Winters | |
| 6,777,712 B2 | 8/2004 | Sanford et al. | |
| 6,777,888 B2 | 8/2004 | Kondo | |
| 6,781,567 B2 | 8/2004 | Kimura | |
| 6,806,497 B2 | 10/2004 | Jo | |
| 6,806,638 B2 | 10/2004 | Lin et al. | |
| 6,806,857 B2 | 10/2004 | Sempel et al. | |
| 6,809,706 B2 | 10/2004 | Shimoda | |
| 6,815,975 B2 | 11/2004 | Nara et al. | |
| 6,828,950 B2 | 12/2004 | Koyama | |
| 6,853,371 B2 | 2/2005 | Miyajima et al. | |
| 6,859,193 B1 | 2/2005 | Yumoto | |
| 6,873,117 B2 | 3/2005 | Ishizuka | |
| 6,876,346 B2 | 4/2005 | Anzai et al. | |
| 6,885,356 B2 | 4/2005 | Hashimoto | |
| 6,900,485 B2 | 5/2005 | Lee | |
| 6,903,734 B2 | 6/2005 | Eu | |
| 6,909,243 B2 | 6/2005 | Inukai | |
| 6,909,419 B2 | 6/2005 | Zavracky et al. | |
| 6,911,960 B1 | 6/2005 | Yokoyama | |
| 6,911,964 B2 | 6/2005 | Lee et al. | |
| 6,914,448 B2 | 7/2005 | Jinno | |
| 6,919,871 B2 | 7/2005 | Kwon | |
| 6,924,602 B2 | 8/2005 | Komiya | |
| 6,937,215 B2 | 8/2005 | Lo | |
| 6,937,220 B2 | 8/2005 | Kitaura et al. | |
| 6,940,214 B1 | 9/2005 | Komiya et al. | |
| 6,943,500 B2 | 9/2005 | LeChevalier | |
| 6,947,022 B2 | 9/2005 | McCartney | |
| 6,954,194 B2 | 10/2005 | Matsumoto et al. | |
| 6,956,547 B2 | 10/2005 | Bae et al. | |
| 6,975,142 B2 | 12/2005 | Azami et al. | |
| 6,975,332 B2 | 12/2005 | Arnold et al. | |
| 6,995,510 B2 | 2/2006 | Murakami et al. | |
| 6,995,519 B2 * | 2/2006 | Arnold | G09G 3/3225 315/169.3 |
| 7,023,408 B2 | 4/2006 | Chen et al. | |
| 7,027,015 B2 | 4/2006 | Booth, Jr. et al. | |
| 7,027,078 B2 | 4/2006 | Reihl | |
| 7,034,793 B2 | 4/2006 | Sekiya et al. | |
| 7,038,392 B2 | 5/2006 | Libsch et al. | |
| 7,057,359 B2 | 6/2006 | Hung et al. | |
| 7,061,451 B2 | 6/2006 | Kimura | |
| 7,064,733 B2 | 6/2006 | Cok et al. | |
| 7,071,932 B2 | 7/2006 | Libsch et al. | |
| 7,088,051 B1 | 8/2006 | Cok | |
| 7,088,052 B2 | 8/2006 | Kimura | |
| 7,102,378 B2 | 9/2006 | Kuo et al. | |
| 7,106,285 B2 | 9/2006 | Naugler | |
| 7,112,820 B2 | 9/2006 | Change et al. | |
| 7,116,058 B2 | 10/2006 | Lo et al. | |
| 7,119,493 B2 | 10/2006 | Fryer et al. | |
| 7,122,835 B1 | 10/2006 | Ikeda et al. | |
| 7,127,380 B1 | 10/2006 | Iverson et al. | |
| 7,129,914 B2 | 10/2006 | Knapp et al. | |
| 7,164,417 B2 | 1/2007 | Cok | |
| 7,193,589 B2 | 3/2007 | Yoshida et al. | |
| 7,224,332 B2 | 5/2007 | Cok | |
| 7,227,519 B1 | 6/2007 | Kawase et al. | |
| 7,245,277 B2 | 7/2007 | Ishizuka | |
| 7,248,236 B2 | 7/2007 | Nathan et al. | |
| 7,262,753 B2 | 8/2007 | Tanghe et al. | |
| 7,274,363 B2 | 9/2007 | Ishizuka et al. | |
| 7,310,092 B2 | 12/2007 | Forrest et al. | |

(56) References Cited

U.S. PATENT DOCUMENTS

| | | | |
|---|---|---|---|
| 7,315,295 B2 | 1/2008 | Kimura | |
| 7,321,348 B2 | 1/2008 | Cok et al. | |
| 7,339,560 B2 | 3/2008 | Sun | |
| 7,355,574 B1 | 4/2008 | Leon et al. | |
| 7,358,941 B2 | 4/2008 | Ono et al. | |
| 7,368,868 B2 | 5/2008 | Sakamoto | |
| 7,411,571 B2 | 8/2008 | Huh | |
| 7,414,600 B2 | 8/2008 | Nathan et al. | |
| 7,423,617 B2 | 9/2008 | Giraldo et al. | |
| 7,474,285 B2 | 1/2009 | Kimura | |
| 7,502,000 B2 | 3/2009 | Yuki et al. | |
| 7,528,812 B2 | 5/2009 | Tsuge et al. | |
| 7,535,449 B2 | 5/2009 | Miyazawa | |
| 7,554,512 B2 | 6/2009 | Steer | |
| 7,569,849 B2 | 8/2009 | Nathan et al. | |
| 7,576,718 B2 | 8/2009 | Miyazawa | |
| 7,580,012 B2 | 8/2009 | Kim et al. | |
| 7,589,707 B2 | 9/2009 | Chou | |
| 7,609,239 B2 | 10/2009 | Chang | |
| 7,619,594 B2 | 11/2009 | Hu | |
| 7,619,597 B2 | 11/2009 | Nathan et al. | |
| 7,633,470 B2 | 12/2009 | Kane | |
| 7,656,370 B2 | 2/2010 | Schneider et al. | |
| 7,800,558 B2 | 9/2010 | Routley et al. | |
| 7,847,764 B2 | 12/2010 | Cok et al. | |
| 7,859,492 B2 | 12/2010 | Kohno | |
| 7,868,859 B2 | 1/2011 | Tomida et al. | |
| 7,876,294 B2 | 1/2011 | Sasaki et al. | |
| 7,924,249 B2 | 4/2011 | Nathan et al. | |
| 7,932,883 B2 | 4/2011 | Klompenhouwer et al. | |
| 7,969,390 B2 | 6/2011 | Yoshida | |
| 7,978,187 B2 | 7/2011 | Nathan et al. | |
| 7,994,712 B2 | 8/2011 | Sung et al. | |
| 8,026,876 B2 | 9/2011 | Nathan et al. | |
| 8,049,420 B2 | 11/2011 | Tamura et al. | |
| 8,077,123 B2 | 12/2011 | Naugler, Jr. | |
| 8,115,707 B2 | 2/2012 | Nathan et al. | |
| 8,212,749 B2* | 7/2012 | Cho | G09G 3/3241 313/463 |
| 8,223,177 B2 | 7/2012 | Nathan et al. | |
| 8,232,939 B2 | 7/2012 | Nathan et al. | |
| 8,242,985 B2* | 8/2012 | Kishi | G09G 3/3233 315/169.1 |
| 8,253,661 B2* | 8/2012 | Sun | G09G 3/3275 345/77 |
| 8,259,044 B2 | 9/2012 | Nathan et al. | |
| 8,264,431 B2 | 9/2012 | Bulovic et al. | |
| 8,279,143 B2 | 10/2012 | Nathan et al. | |
| 8,284,128 B2* | 10/2012 | Kimura | G09G 3/3283 315/169.3 |
| 8,339,386 B2 | 12/2012 | Leon et al. | |
| 9,275,579 B2* | 3/2016 | Chaji | G09G 3/3258 |
| 9,280,933 B2* | 3/2016 | Chaji | G09G 3/3233 |
| 9,472,139 B2* | 10/2016 | Nathan | G09G 3/3241 |
| 9,842,544 B2* | 12/2017 | Nathan | G09G 3/3258 |
| 9,852,689 B2* | 12/2017 | Nathan | G09G 3/3241 |
| 2001/0002703 A1 | 6/2001 | Koyama | |
| 2001/0009283 A1 | 7/2001 | Arao et al. | |
| 2001/0024181 A1 | 9/2001 | Kubota | |
| 2001/0024186 A1 | 9/2001 | Kane et al. | |
| 2001/0026257 A1 | 10/2001 | Kimura | |
| 2001/0030323 A1 | 10/2001 | Ikeda | |
| 2001/0040541 A1 | 11/2001 | Yoneda et al. | |
| 2001/0043173 A1 | 11/2001 | Troutman | |
| 2001/0045929 A1 | 11/2001 | Prache | |
| 2001/0052606 A1 | 12/2001 | Sempel et al. | |
| 2001/0052940 A1 | 12/2001 | Hagihara et al. | |
| 2002/0000576 A1 | 1/2002 | Inukai | |
| 2002/0011796 A1 | 1/2002 | Koyama | |
| 2002/0011799 A1 | 1/2002 | Kimura | |
| 2002/0012057 A1 | 1/2002 | Kimura | |
| 2002/0014851 A1 | 2/2002 | Tai et al. | |
| 2002/0018034 A1 | 2/2002 | Ohki et al. | |
| 2002/0030190 A1 | 3/2002 | Ohtani et al. | |
| 2002/0047565 A1 | 4/2002 | Nara et al. | |
| 2002/0052086 A1 | 5/2002 | Maeda | |
| 2002/0067134 A1 | 6/2002 | Kawashima | |
| 2002/0084463 A1 | 7/2002 | Sanford et al. | |
| 2002/0101172 A1 | 8/2002 | Bu | |
| 2002/0105279 A1 | 8/2002 | Kimura | |
| 2002/0117722 A1 | 8/2002 | Osada et al. | |
| 2002/0122308 A1 | 9/2002 | Ikeda | |
| 2002/0158587 A1 | 10/2002 | Komiya | |
| 2002/0158666 A1 | 10/2002 | Azami et al. | |
| 2002/0158823 A1 | 10/2002 | Zavracky et al. | |
| 2002/0167474 A1 | 11/2002 | Everitt | |
| 2002/0180369 A1 | 12/2002 | Koyama | |
| 2002/0180721 A1 | 12/2002 | Kimura et al. | |
| 2002/0186214 A1 | 12/2002 | Siwinski | |
| 2002/0190924 A1 | 12/2002 | Asano et al. | |
| 2002/0190971 A1 | 12/2002 | Nakamura et al. | |
| 2002/0195967 A1 | 12/2002 | Kim et al. | |
| 2002/0195968 A1 | 12/2002 | Sanford et al. | |
| 2003/0020413 A1 | 1/2003 | Oomura | |
| 2003/0030603 A1 | 2/2003 | Shimoda | |
| 2003/0043088 A1 | 3/2003 | Booth et al. | |
| 2003/0057895 A1 | 3/2003 | Kimura | |
| 2003/0058226 A1* | 3/2003 | Bertram et al. | 345/173 |
| 2003/0062524 A1 | 4/2003 | Kimura | |
| 2003/0063081 A1 | 4/2003 | Kimura et al. | |
| 2003/0071821 A1 | 4/2003 | Sundahl et al. | |
| 2003/0076048 A1 | 4/2003 | Rutherford | |
| 2003/0090447 A1 | 5/2003 | Kimura | |
| 2003/0090481 A1 | 5/2003 | Kimura | |
| 2003/0107560 A1 | 6/2003 | Yumoto et al. | |
| 2003/0111966 A1 | 6/2003 | Mikami et al. | |
| 2003/0122745 A1 | 7/2003 | Miyazawa | |
| 2003/0122813 A1 | 7/2003 | Ishizuki et al. | |
| 2003/0137344 A1* | 7/2003 | Kimball | H03F 1/086 330/9 |
| 2003/0142088 A1 | 7/2003 | LeChevalier | |
| 2003/0151569 A1 | 8/2003 | Lee et al. | |
| 2003/0156101 A1 | 8/2003 | Le Chevalier | |
| 2003/0174152 A1 | 9/2003 | Noguchi | |
| 2003/0179626 A1 | 9/2003 | Sanford et al. | |
| 2003/0197663 A1 | 10/2003 | Lee et al. | |
| 2003/0210256 A1* | 11/2003 | Mori et al. | 345/690 |
| 2003/0230141 A1 | 12/2003 | Gilmour et al. | |
| 2003/0230980 A1 | 12/2003 | Forrest et al. | |
| 2003/0231148 A1 | 12/2003 | Lin et al. | |
| 2004/0032382 A1 | 2/2004 | Cok et al. | |
| 2004/0066357 A1 | 4/2004 | Kawasaki | |
| 2004/0070557 A1 | 4/2004 | Asano et al. | |
| 2004/0070558 A1* | 4/2004 | Cok | G09G 3/3225 345/76 |
| 2004/0070565 A1 | 4/2004 | Nayar et al. | |
| 2004/0090186 A1 | 5/2004 | Kanauchi et al. | |
| 2004/0090400 A1 | 5/2004 | Yoo | |
| 2004/0095297 A1* | 5/2004 | Libsch et al. | 345/76 |
| 2004/0100427 A1 | 5/2004 | Miyazawa | |
| 2004/0108518 A1 | 6/2004 | Jo | |
| 2004/0135749 A1 | 7/2004 | Kondakov et al. | |
| 2004/0145547 A1 | 7/2004 | Oh | |
| 2004/0150592 A1 | 8/2004 | Mizukoshi et al. | |
| 2004/0150594 A1 | 8/2004 | Koyama et al. | |
| 2004/0150595 A1 | 8/2004 | Kasai | |
| 2004/0155841 A1 | 8/2004 | Kasai | |
| 2004/0174347 A1 | 9/2004 | Sun et al. | |
| 2004/0174354 A1 | 9/2004 | Ono et al. | |
| 2004/0178743 A1 | 9/2004 | Miller et al. | |
| 2004/0183759 A1 | 9/2004 | Stevenson et al. | |
| 2004/0189627 A1* | 9/2004 | Shirasaki et al. | 345/204 |
| 2004/0196275 A1 | 10/2004 | Hattori | |
| 2004/0207615 A1 | 10/2004 | Yumoto | |
| 2004/0239596 A1 | 12/2004 | Ono et al. | |
| 2004/0252089 A1 | 12/2004 | Ono et al. | |
| 2004/0257313 A1 | 12/2004 | Kawashima et al. | |
| 2004/0257353 A1 | 12/2004 | Imamura et al. | |
| 2004/0257355 A1 | 12/2004 | Naugler | |
| 2004/0263437 A1 | 12/2004 | Hattori | |
| 2004/0263444 A1 | 12/2004 | Kimura | |
| 2004/0263445 A1 | 12/2004 | Inukai et al. | |
| 2004/0263541 A1 | 12/2004 | Takeuchi et al. | |
| 2005/0007355 A1 | 1/2005 | Miura | |

(56) References Cited

U.S. PATENT DOCUMENTS

| | | |
|---|---|---|
| 2005/0007357 A1 | 1/2005 | Yamashita et al. |
| 2005/0017650 A1 | 1/2005 | Fryer et al. |
| 2005/0024081 A1 | 2/2005 | Kuo et al. |
| 2005/0024393 A1 | 2/2005 | Kondo et al. |
| 2005/0030267 A1 | 2/2005 | Tanghe et al. |
| 2005/0057580 A1 | 3/2005 | Yamano et al. |
| 2005/0067970 A1 | 3/2005 | Libsch et al. |
| 2005/0067971 A1 | 3/2005 | Kane |
| 2005/0068270 A1 | 3/2005 | Awakura |
| 2005/0068275 A1* | 3/2005 | Kane ............... G09G 3/3283 345/82 |
| 2005/0073264 A1 | 4/2005 | Matsumoto |
| 2005/0083323 A1 | 4/2005 | Suzuki et al. |
| 2005/0088103 A1 | 4/2005 | Kageyama et al. |
| 2005/0110420 A1 | 5/2005 | Arnold et al. |
| 2005/0110807 A1 | 5/2005 | Chang |
| 2005/0140598 A1 | 6/2005 | Kim et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0179626 A1 | 8/2005 | Yuki et al. |
| 2005/0179628 A1 | 8/2005 | Kimura |
| 2005/0185200 A1 | 8/2005 | Tobol |
| 2005/0200575 A1 | 9/2005 | Kim et al. |
| 2005/0206590 A1 | 9/2005 | Sasaki et al. |
| 2005/0219184 A1 | 10/2005 | Zehner et al. |
| 2005/0248515 A1 | 11/2005 | Naugler et al. |
| 2005/0259054 A1* | 11/2005 | Wu ............... G09G 3/3216 345/82 |
| 2005/0269959 A1 | 12/2005 | Uchino et al. |
| 2005/0269960 A1 | 12/2005 | Ono et al. |
| 2005/0280615 A1 | 12/2005 | Cok et al. |
| 2005/0280766 A1 | 12/2005 | Johnson et al. |
| 2005/0285822 A1 | 12/2005 | Reddy et al. |
| 2005/0285825 A1 | 12/2005 | Eom et al. |
| 2006/0001613 A1 | 1/2006 | Routley et al. |
| 2006/0007072 A1 | 1/2006 | Choi et al. |
| 2006/0012310 A1 | 1/2006 | Chen et al. |
| 2006/0012311 A1 | 1/2006 | Ogawa |
| 2006/0027807 A1 | 2/2006 | Nathan et al. |
| 2006/0030084 A1 | 2/2006 | Young |
| 2006/0038758 A1* | 2/2006 | Routley et al. ............... 345/81 |
| 2006/0038762 A1 | 2/2006 | Chou |
| 2006/0066533 A1 | 3/2006 | Sato et al. |
| 2006/0077135 A1 | 4/2006 | Cok et al. |
| 2006/0082523 A1 | 4/2006 | Guo et al. |
| 2006/0082529 A1* | 4/2006 | Oyama ............... 345/82 |
| 2006/0092185 A1 | 5/2006 | Jo et al. |
| 2006/0097628 A1 | 5/2006 | Suh et al. |
| 2006/0097631 A1 | 5/2006 | Lee |
| 2006/0103611 A1 | 5/2006 | Choi |
| 2006/0149493 A1 | 7/2006 | Sambandan et al. |
| 2006/0170623 A1 | 8/2006 | Naugler, Jr. et al. |
| 2006/0176250 A1 | 8/2006 | Nathan et al. |
| 2006/0208961 A1* | 9/2006 | Nathan et al. ............... 345/44 |
| 2006/0232522 A1* | 10/2006 | Roy ............... G09G 3/3291 345/76 |
| 2006/0244697 A1 | 11/2006 | Lee et al. |
| 2006/0261841 A1 | 11/2006 | Fish |
| 2006/0273997 A1 | 12/2006 | Nathan et al. |
| 2006/0284801 A1 | 12/2006 | Yoon et al. |
| 2006/0284895 A1 | 12/2006 | Marcu et al. |
| 2006/0290618 A1 | 12/2006 | Goto |
| 2007/0001937 A1 | 1/2007 | Park et al. |
| 2007/0001939 A1 | 1/2007 | Hashimoto et al. |
| 2007/0008268 A1 | 1/2007 | Park et al. |
| 2007/0008297 A1 | 1/2007 | Bassetti |
| 2007/0057873 A1 | 3/2007 | Uchino et al. |
| 2007/0069998 A1 | 3/2007 | Naugler et al. |
| 2007/0075727 A1 | 4/2007 | Nakano et al. |
| 2007/0076226 A1 | 4/2007 | Klompenhouwer et al. |
| 2007/0080905 A1 | 4/2007 | Takahara |
| 2007/0080906 A1 | 4/2007 | Tanabe |
| 2007/0080908 A1 | 4/2007 | Nathan et al. |
| 2007/0097038 A1 | 5/2007 | Yamazaki et al. |
| 2007/0097041 A1 | 5/2007 | Park et al. |
| 2007/0103419 A1 | 5/2007 | Uchino et al. |
| 2007/0115221 A1 | 5/2007 | Buchhauser et al. |
| 2007/0182671 A1 | 8/2007 | Nathan et al. |
| 2007/0236517 A1 | 10/2007 | Kimpe |
| 2007/0241999 A1 | 10/2007 | Lin |
| 2007/0273294 A1 | 11/2007 | Nagayama |
| 2007/0285359 A1 | 12/2007 | Ono |
| 2007/0290958 A1 | 12/2007 | Cok |
| 2007/0296672 A1 | 12/2007 | Kim et al. |
| 2008/0001525 A1 | 1/2008 | Chao et al. |
| 2008/0001544 A1 | 1/2008 | Murakami et al. |
| 2008/0036708 A1 | 2/2008 | Shirasaki |
| 2008/0042942 A1 | 2/2008 | Takahashi |
| 2008/0042948 A1 | 2/2008 | Yamashita et al. |
| 2008/0048951 A1 | 2/2008 | Naugler, Jr. et al. |
| 2008/0055209 A1 | 3/2008 | Cok |
| 2008/0074413 A1 | 3/2008 | Ogura |
| 2008/0088549 A1 | 4/2008 | Nathan et al. |
| 2008/0088648 A1 | 4/2008 | Nathan et al. |
| 2008/0117144 A1 | 5/2008 | Nakano et al. |
| 2008/0150847 A1 | 6/2008 | Kim et al. |
| 2008/0231558 A1 | 9/2008 | Naugler |
| 2008/0231562 A1 | 9/2008 | Kwon |
| 2008/0238327 A1* | 10/2008 | Cho ............... G09G 3/3241 315/169.3 |
| 2008/0252571 A1 | 11/2008 | Hente et al. |
| 2008/0290805 A1 | 11/2008 | Yamada et al. |
| 2008/0297055 A1 | 12/2008 | Miyake et al. |
| 2009/0058772 A1 | 3/2009 | Lee |
| 2009/0160743 A1 | 6/2009 | Tomida et al. |
| 2009/0174628 A1 | 7/2009 | Wang et al. |
| 2009/0184901 A1 | 7/2009 | Kwon |
| 2009/0195483 A1 | 8/2009 | Naugler, Jr. et al. |
| 2009/0201281 A1 | 8/2009 | Routley et al. |
| 2009/0213046 A1 | 8/2009 | Nam |
| 2010/0004891 A1 | 1/2010 | Ahlers et al. |
| 2010/0026725 A1 | 2/2010 | Smith |
| 2010/0060911 A1 | 3/2010 | Marcu et al. |
| 2010/0165002 A1 | 7/2010 | Ahn |
| 2010/0194670 A1 | 8/2010 | Cok |
| 2010/0207960 A1 | 8/2010 | Kimpe et al. |
| 2010/0277400 A1 | 11/2010 | Jeong |
| 2010/0315319 A1 | 12/2010 | Cok et al. |
| 2011/0069051 A1 | 3/2011 | Nakamura et al. |
| 2011/0069089 A1 | 3/2011 | Kopf et al. |
| 2011/0074750 A1 | 3/2011 | Leon et al. |
| 2011/0149166 A1 | 6/2011 | Botzas et al. |
| 2011/0227964 A1 | 9/2011 | Chaji et al. |
| 2011/0293480 A1 | 12/2011 | Mueller |
| 2012/0056558 A1 | 3/2012 | Toshiya et al. |
| 2012/0062565 A1 | 3/2012 | Fuchs et al. |
| 2012/0299978 A1 | 11/2012 | Chaji |
| 2013/0027381 A1 | 1/2013 | Nathan et al. |
| 2013/0057595 A1 | 3/2013 | Nathan et al. |
| 2013/0099692 A1* | 4/2013 | Chaji ............... H05B 37/02 315/224 |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 438 577 | 8/2002 |
| CA | 2 463 653 | 1/2004 |
| CA | 2 498 136 | 3/2004 |
| CA | 2 522 396 | 11/2004 |
| CA | 2 443 206 | 3/2005 |
| CA | 2 472 671 | 12/2005 |
| CA | 2 567 076 | 1/2006 |
| CA | 2 526 782 | 4/2006 |
| CA | 2 550 102 | 4/2008 |
| CN | 1381032 | 11/2002 |
| CN | 1448908 | 10/2003 |
| CN | 1760945 | 4/2006 |

(56) References Cited

FOREIGN PATENT DOCUMENTS

| | | |
|---|---|---|
| EP | 0 158 366 | 10/1985 |
| EP | 1 028 471 | 8/2000 |
| EP | 1 111 577 | 6/2001 |
| EP | 1 130 565 A1 | 9/2001 |
| EP | 1 194 013 | 4/2002 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 465 143 A | 10/2004 |
| EP | 1 469 448 A | 10/2004 |
| EP | 1 521 203 A2 | 4/2005 |
| EP | 1 594 347 | 11/2005 |
| EP | 1 784 055 A2 | 5/2007 |
| EP | 1854338 A1 | 11/2007 |
| EP | 1 879 169 A1 | 1/2008 |
| EP | 1 879 172 | 1/2008 |
| GB | 2 389 951 A | 12/2003 |
| JP | 1272298 | 10/1989 |
| JP | 4-042619 | 2/1992 |
| JP | 6-314977 | 11/1994 |
| JP | 8-340243 | 12/1996 |
| JP | 09-090405 | 4/1997 |
| JP | 10-254410 | 9/1998 |
| JP | 11-202295 | 7/1999 |
| JP | 11-219146 | 8/1999 |
| JP | 11 231805 | 8/1999 |
| JP | 11-282419 | 10/1999 |
| JP | 2000-056847 | 2/2000 |
| JP | 2000-81607 | 3/2000 |
| JP | 2001-134217 | 5/2001 |
| JP | 2001-195014 | 7/2001 |
| JP | 2002055654 | 2/2002 |
| JP | 2002-91376 | 3/2002 |
| JP | 2002514320 | 5/2002 |
| JP | 2002-278513 | 9/2002 |
| JP | 2002-333862 | 11/2002 |
| JP | 2003-076331 | 3/2003 |
| JP | 2003124519 | 4/2003 |
| JP | 2003-177709 | 6/2003 |
| JP | 2003-271095 | 9/2003 |
| JP | 2003-308046 | 10/2003 |
| JP | 2003-317944 | 11/2003 |
| JP | 2004-145197 | 5/2004 |
| JP | 2004-287345 | 10/2004 |
| JP | 2005-057217 | 3/2005 |
| JP | 4-158570 | 10/2008 |
| KR | 2004-0100887 | 12/2004 |
| TW | 342486 | 10/1998 |
| TW | 473622 | 1/2002 |
| TW | 485337 | 5/2002 |
| TW | 502233 | 9/2002 |
| TW | 538650 | 6/2003 |
| TW | 1221268 | 9/2004 |
| TW | 200727247 | 7/2007 |
| WO | WO 1998/48403 | 10/1998 |
| WO | WO 1999/48079 | 9/1999 |
| WO | WO 2001/06484 | 1/2001 |
| WO | WO 2001/27910 A1 | 4/2001 |
| WO | WO 2001/63587 A2 | 8/2001 |
| WO | WO 2002/067327 A | 8/2002 |
| WO | WO 2003/001496 A1 | 1/2003 |
| WO | WO 2003/034389 A | 4/2003 |
| WO | 2003/063124 | 7/2003 |
| WO | WO 2003/058594 A1 | 7/2003 |
| WO | WO 2003/077231 | 9/2003 |
| WO | WO 2004/003877 | 1/2004 |
| WO | WO 2004/025615 A | 3/2004 |
| WO | WO 2004/034364 | 4/2004 |
| WO | WO 2004/047058 | 6/2004 |
| WO | WO 2004/104975 A1 | 12/2004 |
| WO | WO 2005/022498 | 3/2005 |
| WO | WO 2005/022500 A | 3/2005 |
| WO | WO 2005/029455 | 3/2005 |
| WO | WO 2005/029456 | 3/2005 |
| WO | WO 2005/055185 | 6/2005 |
| WO | WO 2006/000101 A1 | 1/2006 |
| WO | WO 2006/053424 | 5/2006 |
| WO | WO 2006/063448 A | 6/2006 |
| WO | WO 2006/084360 A1 | 8/2006 |
| WO | WO 2007/003877 A | 1/2007 |
| WO | WO 2007/079572 | 7/2007 |
| WO | WO 2007/120849 A2 | 10/2007 |
| WO | WO 2009/055920 | 5/2009 |
| WO | WO 2010/023270 | 3/2010 |
| WO | WO 2011/041224 A1 | 4/2011 |

OTHER PUBLICATIONS

Alexander et al.: "Unique Electrical Measurement Technology for Compensation, Inspection, and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A Novel Driving Scheme and Pixel Circuit for AMOLED Displays"; dated Jun. 2006 (4 pages).

Chaji et al.: "A Stable Voltage-Programmed Pixel Circuit for a-Si:H AMOLED Displays"; dated Dec. 2006 (12 pages).

Chaji et al.: "A Sub-µA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Electrical Compensation of OLED Luminance Degradation"; dated Dec. 2007 (3 pages).

Chaji et al.: "Fast and Offset-Leakage Insensitive Current-Mode Line Driver for Active Matrix Displays and Sensors"; dated Feb. 2009 (8 pages).

Chaji et al.: "High-precision, fast current source for large-area current-programmed a-Si flat panels"; dated Sep. 2006 (4 pages).

Chaji et al.: "Low-Cost AMOLED Television with IGNIS Compensating Technology"; dated May 2008 (4 pages).

Chaji et al.: "Low-Cost Stable a-Si:H AMOLED Display for Portable Applications"; dated Jun. 2006 (4 pages).

Chaji et al.: "Low-Power Low-Cost Voltage-Programmed a-Si:H AMOLED Display"; dated Jun. 2008 (5 pages).

Chaji et al.: "Merged phototransistor pixel with enhanced near infrared response and flicker noise reduction for biomolecular imaging"; dated Nov. 2008 (3 pages).

Chaji et al.: "Parallel Addressing Scheme for Voltage-Programmed Active-Matrix OLED Displays"; dated May 2007 (6 pages).

Chaji et al.: "Stable a-Si:H circuits based on short-term stress stability of amorphous silicon thin film transistors"; dated May 2006 (4 pages).

Chaji et al.: "Stable Pixel Circuit for Small-Area High- Resolution a-Si:H AMOLED Displays"; dated Oct. 2008 (6 pages).

Chaji et al.: "Stable RGBW AMOLED display with OLED degradation compensation using electrical feedback"; dated Feb. 2010 (2 pages).

Chaji et al.: "Thin-Film Transistor Integration for Biomedical Imaging and AMOLED Displays"; dated 2008 (177 pages).

European Search Report for EP Application No. EP 10166143, dated Sep. 3, 2010 (2 pages).

European Search Report for European Application No. EP 011122313 dated Sep. 14, 2005 (4 pages).

European Search Report for European Application No. EP 04786661 dated Mar. 9, 2009.

(56) References Cited

OTHER PUBLICATIONS

European Search Report for European Application No. EP 05759141 dated Oct. 30, 2009 (2 pages).
European Search Report for European Application No. EP 05819617 dated Jan. 30, 2009.
European Search Report for European Application No. EP 06721798 dated Nov. 12, 2009 (2 pages).
European Search Report for European Application No. EP 07710608.6 dated Mar. 19, 2010 (7 pages).
European Search Report for European Application No. EP 07719579 dated May 20, 2009.
European Search Report for European Application No. EP 07815784 dated Jul. 20, 2010 (2 pages).
European Search Report for European Application No. EP 11739485. 8-1904 dated Aug. 6, 2013, (14 pages).
European Search Report, Application No. EP 10834294.0-1903, dated Apr. 8, 2013, (9 pages).
European Supplementary Search Report corresponding to European Application No. EP 04786662 dated Jan. 19, 2007 (2 pages).
Extended European Search Report dated Apr. 27, 2011 issued during prosecution of European patent application No. EP 09733076.5 (13 pages).
Extended European Search Report dated Jul. 11, 2012 which issued in corresponding European Patent Application No. EP 11191641.7 (14 pages).
Extended European Search Report dated Nov. 29, 2012, issued in European Patent Application No. EP 11168677.0 (13 page).
Fossum, Eric R.. "Active Pixel Sensors: Are CCD's Dinosaurs?" SPIE: Symposium on Electronic Imaging. Feb. 1, 1993 (13 pages).
Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
International Preliminary Report on Patentability for International Application No. PCT/CA2005/001007 dated Oct. 16, 2006, 4 pages.
International Search Report corresponding to co-pending International Patent Application Serial No. PCT/IB2013/054251, Canadian Intellectual Property Office, dated Sep. 11, 2013; (4 pages).
International Search Report corresponding to International Application No. PCT/IB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/ 055486, dated Apr. 19, 2011, 5 pages.
International Search Report for International Application No. PCT/ CA2005/001007 dated Oct. 18, 2005.
International Search Report for International Application No. PCT/ CA2007/000652 dated Jul. 25, 2007.
International Search Report for International Application No. PCT/ CA2004/001741 dated Feb. 21, 2005.
International Search Report for PCT Application No. PCT/CA2009/ 001769, dated Apr. 8, 2010 (3 pages).
International Search Report dated Dec. 3, 2002, issued in International Patent Application No. PCT/JP02/09668 (4 pages).
International Search Report dated Jul. 30, 2009 for International Application No. PCT/CA2009/000501 (4 pages).
International Search Report mailed Mar. 21, 2006 issued in International Patent Application No. PCT/CA2005/001897 (2 pages).
International Search Report, PCT/IB2012/052372, dated Sep. 12, 2012 (3 pages).
International Searching Authority Search Report, PCT/IB2010/ 055481, dated Apr. 7, 2011, 3 pages.
International Searching Authority Search Report, PCT/IB2011/ 051103, dated Jul. 8, 2011, 3 pages.
International Searching Authority Written Opinion, PCT/IB2010/ 055481, dated Apr. 7, 2011, 6 pages.
International Searching Authority Written Opinion, PCT/IB2011/ 051103, dated Jul. 8, 2011, 6 pages.
International Written Opinion corresponding to co-pending International Patent Application Serial No. PCT/IB2013/054251, Canadian Intellectual Property Office, dated Sep. 11, 2013; (5 pages).
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/ 055486, dated Apr. 19, 2011, 8 pages.
International Written Opinion for International Application No. PCT/CA2009/000501 dated Jul. 30, 2009 (6 pages).
International Written Opinion dated Mar. 21, 2006 corresponding to International Patent Application No. PCT/CA2005/001897 (4 pages).
International Written Opinion of the International Searching Authority corresponding to International Application No. PCT/IB2011/ 050502, dated Jun. 27, 2011 (7 pages).
International Written Opinion of the International Searching Authority corresponding to International Application No. PCT/IB2010/ 055541, dated May 26, 2011; 6 pages.
International Written Opinion, PCT/IB2012/052372, dated Sep. 12, 2012 (6 pages).
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee, Wonbok: "Thermal Management in Microprocessor Chips and Dynamic Backlight Control in Liquid Crystal Displays", Ph.D. Dissertation, University of Southern California (124 pages), Aug. 2008.
Ma E Y et al.: "Organic light emitting diode/thin film transistor integration for foldable displays" dated Sep. 15, 1997(4 pages).
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Call for papers second international workshop on compact thin-film transistor (TFT) modeling for circuit simulation"; dated Sep. 2009 (1 page).
Office Action in Japanese patent application No. JP2006-527247 dated Mar. 15, 2010. (8 pages).
Office Action in Japanese patent application No. JP2007-545796 dated Sep. 5, 2011. (8 pages).
Partial European Search Report dated Mar. 20, 2012 which issued in corresponding European Patent Application No. EP 11191641.7 (8 pages).
Partial European Search Report dated Sep. 22, 2011 corresponding to European Patent Application No. EP 11168677.0 (5 pages).
Rafati et al.: "Comparison of a 17 b multiplier in Dual-rail domino and in Dual-rail D L (D L) logic styles"; dated 2002 (4 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Search Report for Taiwan Invention Patent Application No. 093128894 dated May 1, 2012. (1 page).

(56) References Cited

OTHER PUBLICATIONS

Search Report for Taiwan Invention Patent Application No. 94144535 dated Nov. 1, 2012. (1 page).
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
Singh, et al., "Current Conveyor: Novel Universal Active Block", Samriddhi, S-JPSET vol. I, Issue 1, 2010, pp. 41-48.
Alexander et al.: "Pixel circuits and drive schemes for glass and elastic AMOLED displays"; dated Jul. 2005 (9 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A novel driving scheme for high-resolution large-area a-Si:H AMOLED displays"; dated Aug. 2005 (4 pages).
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "eUTDSP: a design study of a new VLIW-based DSP architecture"; dated My 2003 (4 pages).
Chaji et al.: "High Speed Low Power Adder Design With a New Logic Style: Pseudo Dynamic Logic (SDL)"; dated Oct. 2001 (4 pages).
Chaji et al.: "Pseudo dynamic logic (SDL): a high-speed and low-power dynamic logic family"; dated 2002 (4 pages).
European Search Report for European Application No. EP 06 70 5133 dated Jul. 18, 2008.
International Search Report for International Application No. PCT/CA2006/000177 dated Jun. 2, 2006.
Jafarabadiashtiani et al.: "A New Driving Method for a-Si AMOLED Displays Based on Voltage Feedback"; dated 2005 (4 pages).
Lee et al.: "Ambipolar Thin-Film Transistors Fabricated by PECVD Nanocrystalline Silicon"; dated 2006 (6 pages).
Matsueda y et al.: "35.1: 2.5-in. AMOLED with Integrated 6-bit Gamma Compensated Digital Data Driver"; dated May 2004.
Nathan et al.: "Backplane Requirements for Active Matrix Organic Light Emitting Diode Displays"; dated 2006 (16 pages).
Nathan et al.: "Driving schemes for a-Si and LTPS AMOLED displays"; dated Dec. 2005 (11 pages).
Nathan et al.: "Invited Paper: a -Si for AMOLED—Meeting the Performance and Cost Demands of Display Applications (Cell Phone to HDTV)"; dated 2006 (4 pages).
Philipp: "Charge transfer sensing" Sensor Review, vol. 19, No. 2, Dec. 31, 1999 (Dec. 31, 1999), 10 pages.
Safavaian et al.: "Three-TFT image sensor for real-time digital X-ray imaging"; dated Feb. 2, 2006 (2 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).

\* cited by examiner

DRIVING CIRCUIT FOR CURRENT PROGRAMMED ORGANIC LIGHT-EMITTING DIODE DISPLAYS

FIELD OF INVENTION

The present invention relates to methods and apparatus for driving a current line with a parasitic capacitance. In particular, the present invention relates to methods and apparatus for driving organic light-emitting diode (OLED) displays that are current programmed.

BACKGROUND OF THE INVENTION

Maturing of Flat Panel Display (FPD) technologies has provided larger and lower cost laptop monitors, small area/low power panels for cell phones and other portable devices, HDTV and widescreen formats for home television, and high reliability daylight readable displays for "glass cockpits" for aircraft.

Emerging technologies such as organic LEDs (OLED) promise to deliver higher quality emissive flat displays, allowing the removal of the backlight. When compared to LCDs, a thinner form-factor with almost perfect viewing angle and much faster response speed would be provided by OLEDs. Thus the intrinsic characteristics of OLEDs give visual and form factor advantages over LCDs.

A typical array structure of an active matrix organic light-emitting diode (AMOLED) is shown in FIG. 1. The display 100 includes an array of pixels 102 that are arranged in rows and columns. The pixels 102 are connected to the data line 106 via a select transistor 104. The transistor 104 is a thin film transistor (TFT). The data line 106 is driven by a current source 108. The overlap capacitance of the transistors 104 connected to data line 106 and the line capacitance of the data line 106 itself leads to a high parasitic capacitance.

The basic OLED structure for a given pixel 102 consists of a stack of thin organic layers between a transparent anode and a metallic cathode. The organic layers include a hole-injection layer, a hole-transport layer, an emissive layer, and an electron transport layer. When an appropriate voltage is applied to the structure the injected positive and negative charges combine in the emissive layer to product light. OLEDs are therefore self-emissive displays and thus do not require a backlight as is required by LCDs. Also the charge combination process causes very little time delay providing for a fast response time.

OLED displays are current-controlled display devices. LCDs, on the other hand, are voltage-controlled. Current programming provides the OLED with a current that is independent of the characteristics of any other components such as thin film transistors (TFT) or the OLED itself, and compensates for $V_t$ shift, spatial mismatch, and OLED degradation. However, the parasitic capacitance contributed from the line and select transistors connected to the line results in a large settling time. The settling time is a function of the initial line voltage and threshold voltage of the drive TFT. Although, the settling time can be improved partially by pre-charging, the improvement is not sufficient for medium and large area displays.

The parasitic capacitance of the drive transistor and the data line to which it is connected is schematically shown in FIG. 2. In particular FIG. 2 schematically shows the equivalent circuit for a current programmed pixel 202, having a current source 203 and a transistor 204, during a programming cycle. Capacitance $C_P$ 210 and resistance $R_P$ 208 are the parasitic components while capacitance $C_S$ 206 is the capacitance of the storage capacitor. If $C_S$ 206<<$C_P$ 210 and $R_P$ 208 is small, the timing constant, or settling time, of the circuit shown in FIG. 2 is:

$$\tau \propto 2 \frac{C_p}{\sqrt{i*\beta}} \tag{1}$$

where $\beta$ is the coefficient in current-voltage (I-V) characteristics of the transistor 204 given by $I_{ds}=\beta\ (V_{gs}-V_{th})^2$. Here, $I_{ds}$ is the drain-source current, $V_{gs}$ the gate-source voltage, and $V_{th}$ the threshold voltage.

If the capacitance $C_p$ 210 is a large capacitance, around 40 pf, and $\beta$ is small for the transistor 204, which is fabricated with amorphous silicon (a-Si), $\tau$ is of the order of millisecond. However, the timing budget of the programming cycle is less than 100 μs for large area displays. Since the efficiency of the OLED has been increased, the amount of current required to achieve the maximum brightness is very small; therefore, $\tau$, which is also a function of current, increases dramatically.

This parasitic capacitance thus contributes to a high settling time for current programmed pixels, limiting the timing budget of the programming cycle. This can cause considerable error due to imperfect settling. In order to remove this error, a simple and fast solution for driving the current programmed pixels that is suitable for applications in OLED displays is needed.

United States patent application No. 20040095297A1 to Libsch et al. describes a programming method in which the programming current is controlled by a current sensor. A schematic diagram of the circuit of FIG. 1 of Libsch et al. is shown in FIG. 3. During the programming cycle a current sensor 302 monitors the voltage across resistor R 304 through the feedback 308. The current sensor 302 controls the programming current. After the pixel settles, the current flowing through the resistor R 304 and the OLED 306 is the same as wanted current. Because of the use of feedback 308, this driving method has a fast settling time. However, the drawback of this circuit is that it has a high power consumption resulting from resistor R 304. The resistor R 304 should quite large such that the circuit is able to sense a low current level accurately. Therefore, the power dissipated in resistor R 304 is considerable. The other drawback of this circuit is that it suffers from mismatch. The spatial mismatch changes the value of resistor R 304 causing non-uniformity in the display. It also has the addition feedback 308.

U.S. Pat. No. 6,433,488 to Bu discloses an OLED driver circuit that implements a current comparator in a feedback loop. The circuit presented in FIG. 2 of Bu is schematically presented in FIG. 4. In a programming cycle, SCAN is high so the transistor T2 402 is off and the transistor T4 404 is on. Therefore, the current flows through the transistor T3 406, the OLED 408, and the transistor T1 410. A current comparator 412 defines the reference voltage 414 based on comparison result of the pixel current, via feedback line 416, and reference current 418. After the pixel settles, the pixel current 416 is the same as reference current 418. This circuit provides a fast settling time for the pixel because of the use of feedback. However, the circuit has a high power compensation because of the two transistors (T1 410 and T2 402) in the path of current during the driving cycle, further this method uses four transistors and extra feedback line 416.

Therefore there is a need for a circuit that improves the settling time of the current driven circuit that does not encounter the high power consumption of the known circuits.

SUMMARY OF THE INVENTION

The present invention relates to a circuit for driving an OLED pixel. The invention further relates to a circuit that enables the use of current programmed pixel circuits in large area displays by improving the settling time.

It is an object of the invention to obviate or mitigate at least one shortcoming of circuits for improving time sensitivity of the prior art.

In accordance with one aspect of the invention a load driving circuit for a load having a parasitic capacitance associated therewith and being current programmed is provided. The driving circuit having a data line having a voltage controlling the load, a feedback loop having a lowpass filter for monitoring the voltage of the data line, and a current source for providing a current to the data line; the current source being controlled by a signal line and an output from the lowpass filter.

In accordance with another aspect of the invention a driving circuit for a light emitting diode that is current programmed and having a parasitic capacitance is provided. The driving circuit having a data line controlling the light emitting diode, a low pass filter monitoring the voltage of the data line, and a current source for providing a current to the data line; the current source being controlled by a signal line and an output from the lowpass filter.

In accordance with another aspect of the invention a driving circuit for a light emitting diode that is current programmed and having a parasitic capacitance is provided. The driving circuit comprising a data line controlling the light emitting diode, a feedback loop comprising, an analogue to digital converter, and a controller running an algorithm that provides low pass filter functionality to the feedback loop, and a current source for providing a current to the data line; the current source receiving input from a digital to analogue converter that receives input from the controller.

In accordance with another aspect of the invention a method of driving a light emitting diode in a display, the light emitting diode having a parasitic capacitance and being current programmed is provided. The method comprising the steps of providing a current to the light emitting diode, the current being provided by a current source, monitoring a voltage of a data line providing the current to the light emitting diode with a low pass filter, and mixing the voltage and a data line signal to form an input, providing the input to the current source.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
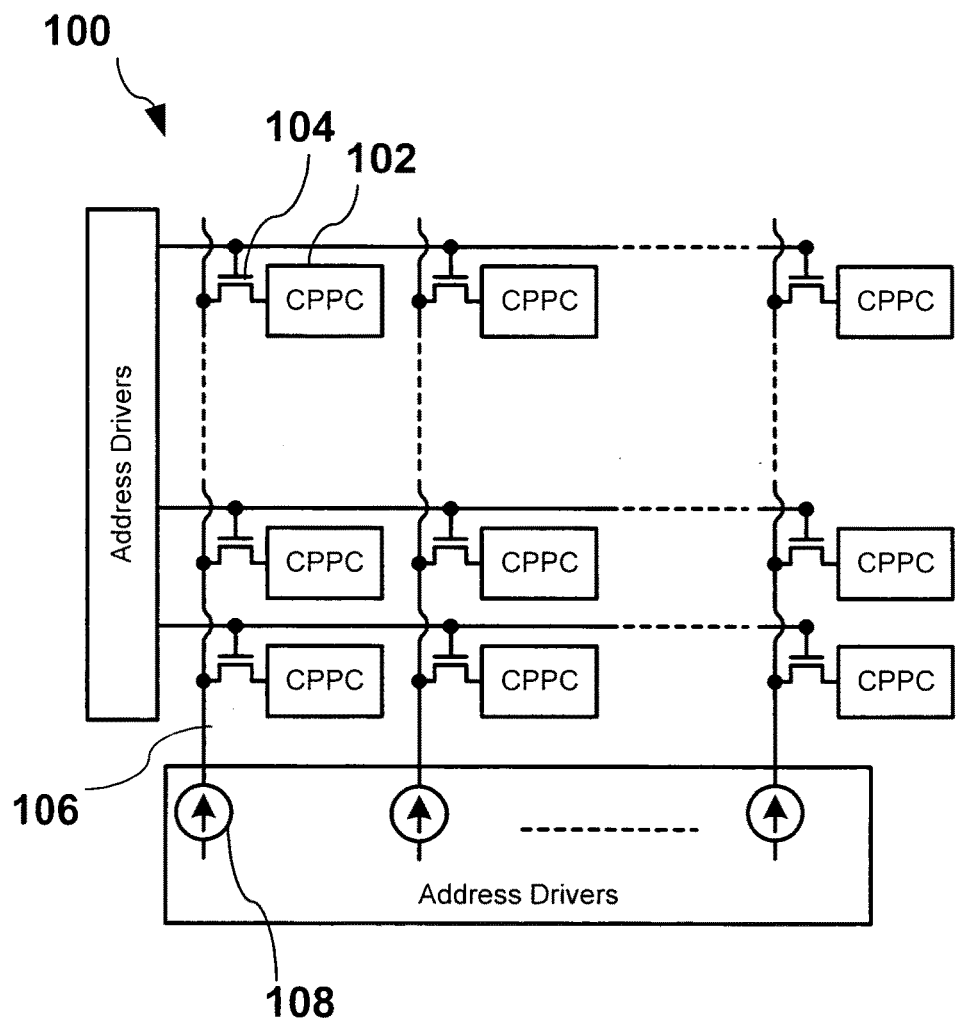
FIG. 1 presents a schematic diagram of a pixel array according of the prior art.
Figure 2:
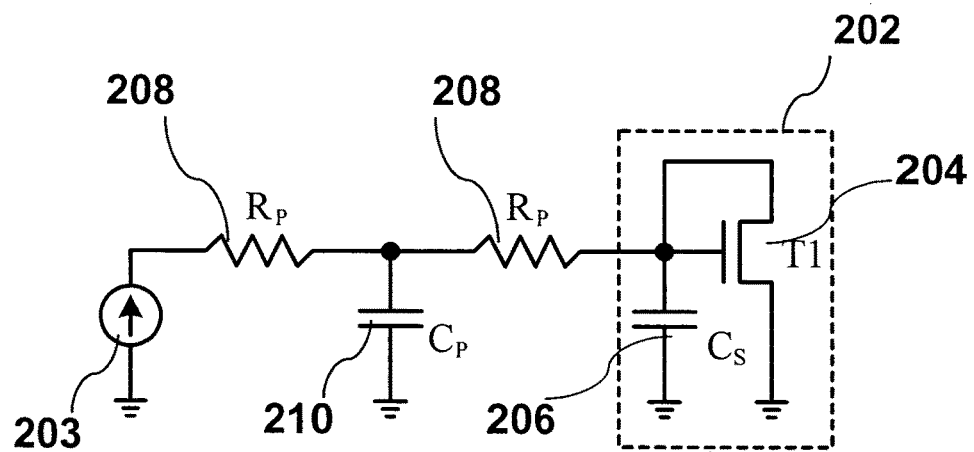
FIG. 2 presents a schematic diagram of parasitics associated with a pixel of an OLED based display of the prior art.
Figure 3:
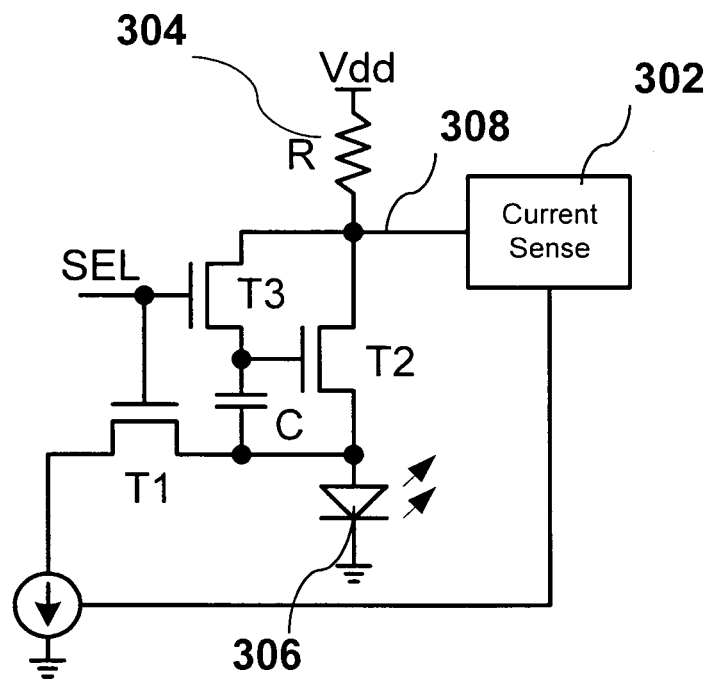
FIG. 3 presents a schematic diagram of pixel programming circuit of the prior art.
Figure 4:
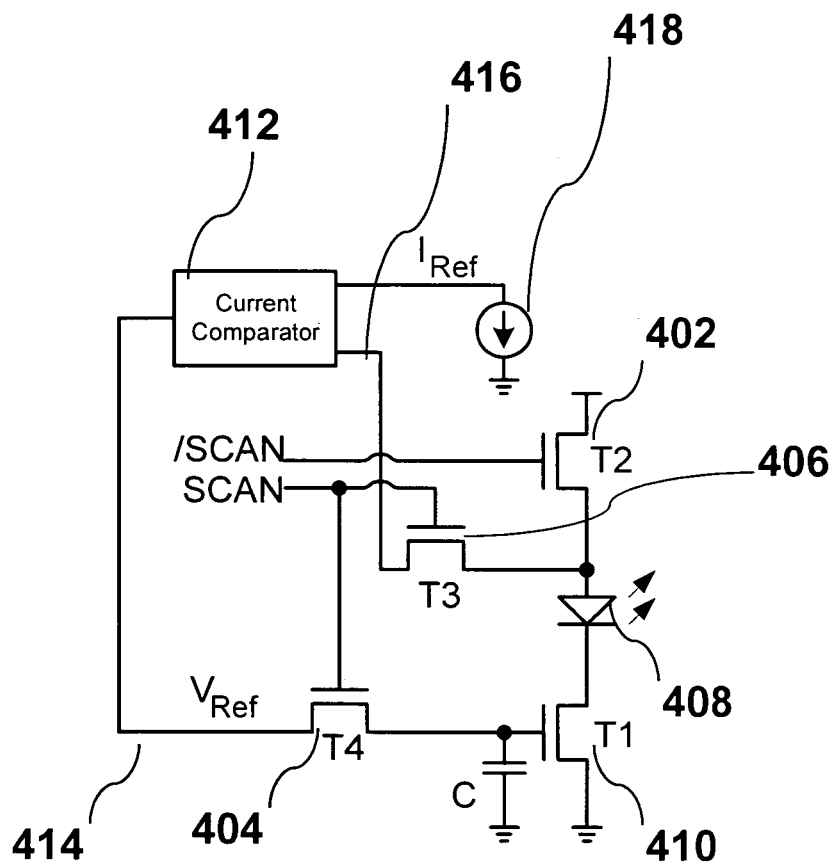
FIG. 4 presents a schematic diagram of another pixel programming circuit of the prior art.

As outlined in the discussion of FIG. 2 the settling of the time of the current can be larger than that allowed because of the parasitic capacitance. Embodiments of the invention consider the use of a feedback circuit to provide positive feedback to a current source. This feedback allows for an improvement in the settling time of the current allowing current driven displays to have the necessary response times.

Figure 5:
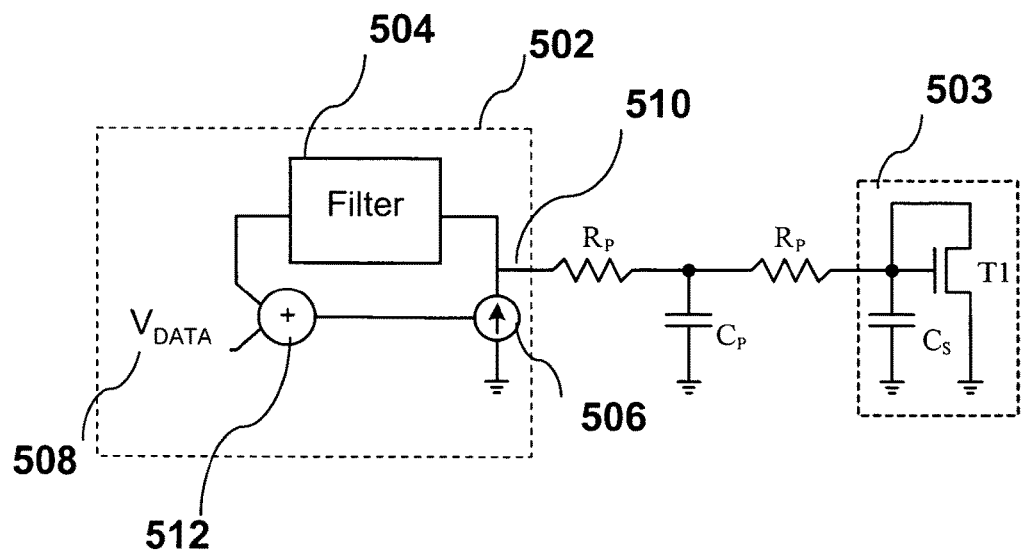
FIG. 5 presents a schematic diagram of a display drive circuit having a feedback circuit in accordance with an embodiment of the invention.

A basic feedback circuit according to one embodiment of the invention is shown in FIG. 5. A display drive circuit 502 is used to drive a light-emitting pixel 503. The drive circuit 502 includes a voltage controlled current source (VCCS) 506 and a feedback loop. Within this feedback loop is a filter 504 and a voltage adder 512. The current source 506 is controlled by $V_{DATA}$ 508 and the output of the filter 504, which monitors the voltage of data line 510. The current source 506, filter 504, and voltage adder 512 are part of the display driver 502 that can be implemented as a separate chip using CMOS technology or as part of a display using on-display TFT technology.

Figure 6:
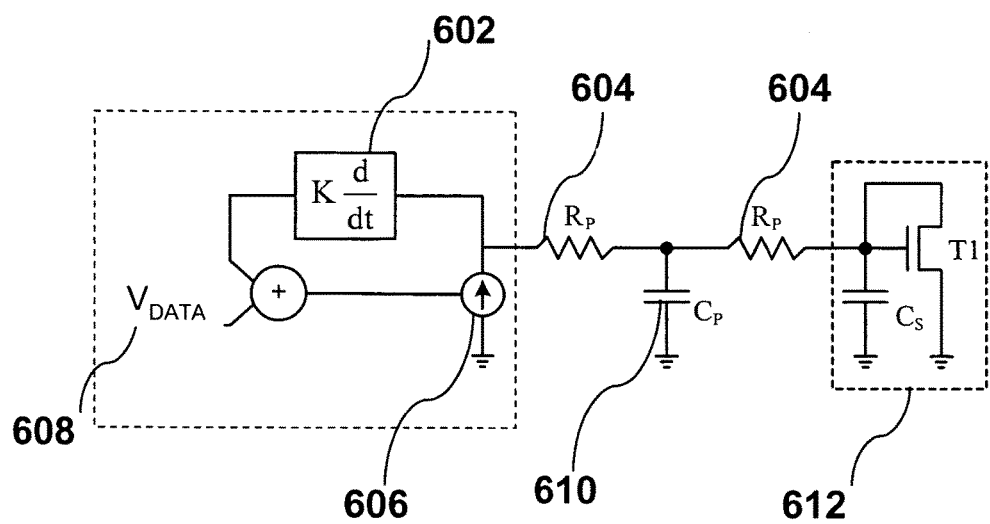
FIG. 6 presents a schematic diagram of a display drive circuit having a feedback circuit in accordance with another embodiment of the invention.

In another embodiment of the invention, shown in FIG. 6, the filter is implemented as a differentiator 602. If the parasitic resistances $R_P$ 604 are small enough and the VCCS 606 is a linear current source, the timing constant for the circuit shown in FIG. 6 is:

$$\tau \propto 2 \frac{(C_p - K)}{\sqrt{i * \beta}} \quad (3)$$

Here 'i' is the current related to $V_{DATA}$ 608. K is the coefficient of the differentiator 602 and should be selected close to the parasitic capacitance $C_P$ 610 in order to achieve the desirable results. However, a reasonable difference between K and $C_P$ has no significant effect on the settling time.

The circuit of FIG. 6 can remove the effect of parasitic capacitance 610 and as a result can be used for fast programming of current programmed pixel 612, which is a general schematic that represent functionality of current programmed pixels. It will be apparent to one of skill in the art that the circuit of FIG. 6 can be used with any current-programmed pixel circuits.

Figure 7:
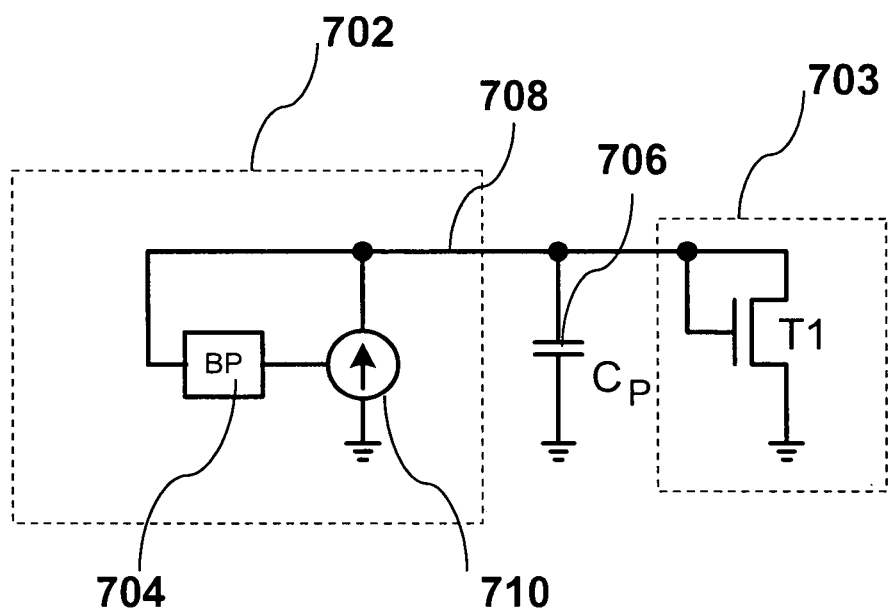
FIG. 7 presents a schematic diagram of a display drive circuit having a bandpass filter in accordance with another embodiment of the invention.

A filter circuit according to the currently preferred embodiment is shown in FIG. 7. In this embodiment the display drive circuit 702 uses a bandpass (BP) filter 704 for the feedback function. The drive circuit 702 drives the pixel 703 and manages the effect of parasitic capacitance $C_P$ 706 through the use of positive feedback. At the beginning of the programming cycle, the voltage of the line 708 changes rapidly, and so the VCCS 710 pumps more current into current line 708. As the voltage of the current line 708 settles, the current supplied by the current source 710 goes to a programming current ($I_P$). Also, the band-pass filter 704 mitigates high-frequency noise of the current line 708, which would otherwise influence the output current of the current source 710.

Figure 8A:
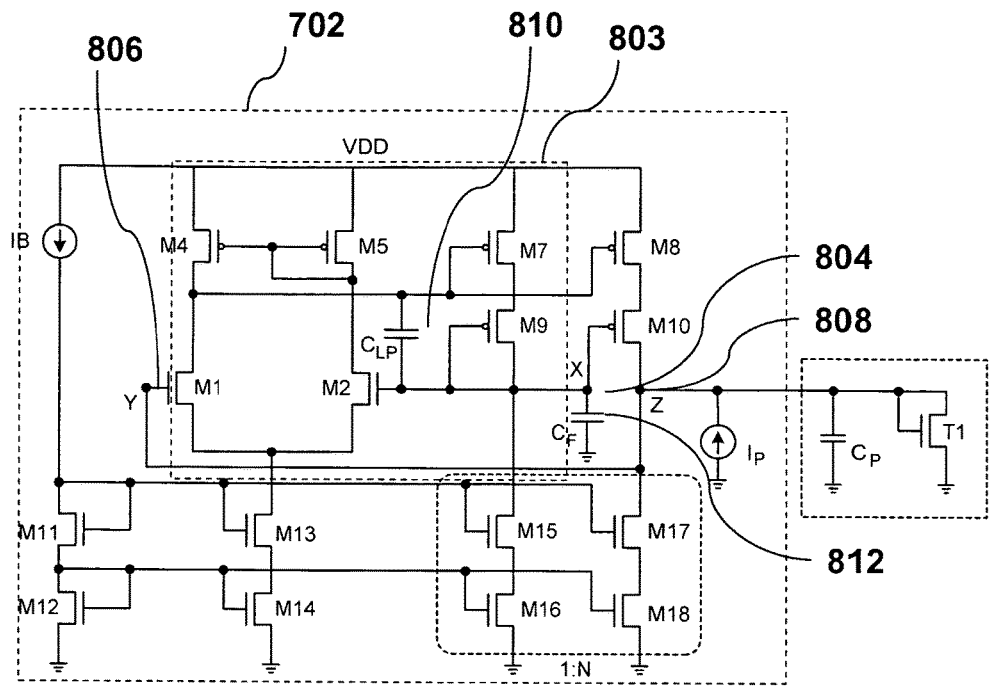
FIG. 8a presents a schematic diagram of a bandpass filter in accordance with another embodiment of the invention.

FIG. 8a presents further detail of the bandpass filter used in display drive circuit 702. A simple filter circuit has been used such that the circuit fits within the pixel pitch of approximately 100 µm. The bandpass filter of FIG. 8A is generally indicated as 803 is implemented as a one-pole lowpass Butterworth filter and a differentiator. In the circuit of FIG. 8a a current conveyer type II (CCII) is used for realization of the driver. The Z terminal 808 is connected directly to the Y terminal 806. Therefore, the voltage of node X 804 follows the voltage of the Z terminal 808 due to a feedback between the Y terminal 806 and the X terminal 804. Also, the capacitor $C_{LP}$ 810 acts as a low pass filter and mitigates any high frequency noise. The capacitor $C_F$ 812, on the other hand, differentiates the voltage at the X terminal 804, which is equal to the voltage of the line and converts it to a current. The current mirror duplicates this current and adds it to the programming current ($I_P$).

Figure 8B:
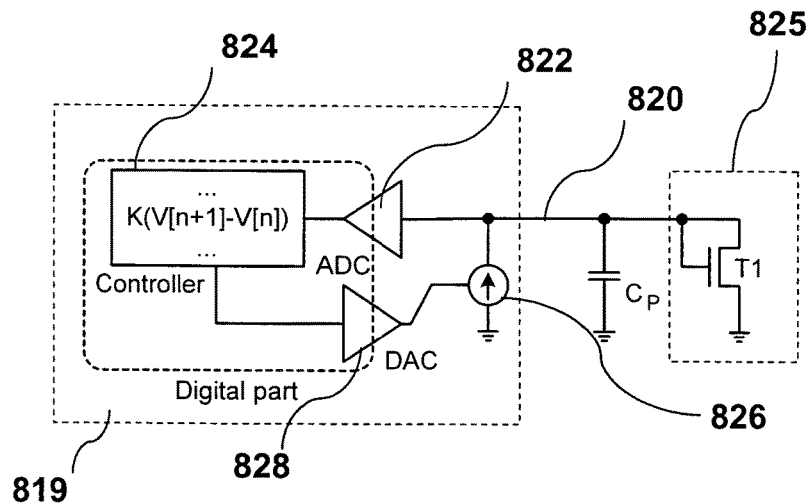
FIG. 8b presents a schematic diagram of a bandpass filter in accordance with another embodiment of the invention.

Another implementation of the lowpass filter that uses a digital implementation is presented in FIG. 8b. In this Figure the drive circuit 819 is used to drive pixel 825. The voltage of the line 820 is read back by an ADC 822. The controller 824 block runs an algorithm and changes the current of the current source 826 using the DAC 828. An important aspect of the algorithm run by the controller 824 is the calculation of the difference between the current sample V[n] and the previous sample V[n−1]. With a consideration to this difference the algorithm adjusts the current provided by the current source 826 to speed up the programming.

Figure 9:
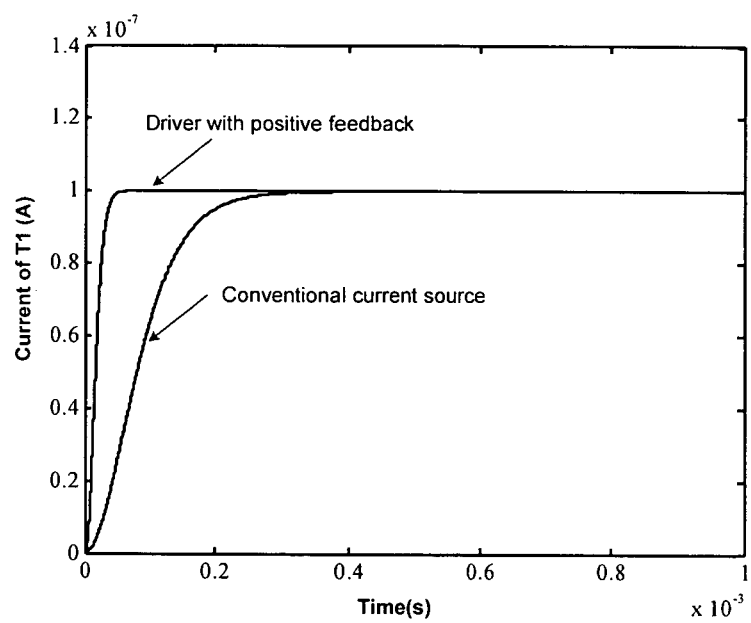
FIG. 9 presents curves of settling time in accordance with another embodiment of the invention.

An analysis of the settling time associated with the circuit of FIG. 8a is shown in FIG. 9. A MATLAB™ model was used to investigate the characteristics of the new current source. To simplify the analysis, the cut-off frequency of the LP filter is considered to be high. Thus, the overdrive voltage of T1 can be written as:

$$I_P = (C_P - C_F)\frac{d}{dt}V - \beta V^2 \qquad (3)$$

where, V is the overdrive voltage of T1, and $C_F$ the gain of differentiator. It is evident that $C_F$ can compensate for the parasitic capacitance.

In FIG. 9 the settling time of the current source of the drive circuit 702 that implements a LP filter is less than 40 µs whereas it is 400 µs for the conventional case i.e. the current is provided by the current source with no feedback. It is also evident that increasing the cut-off frequency of the low pass filter makes the driver more sensitive to the noise of the current line. There is however an increase in the speed as the cut-off frequency increases.

Figure 10A:
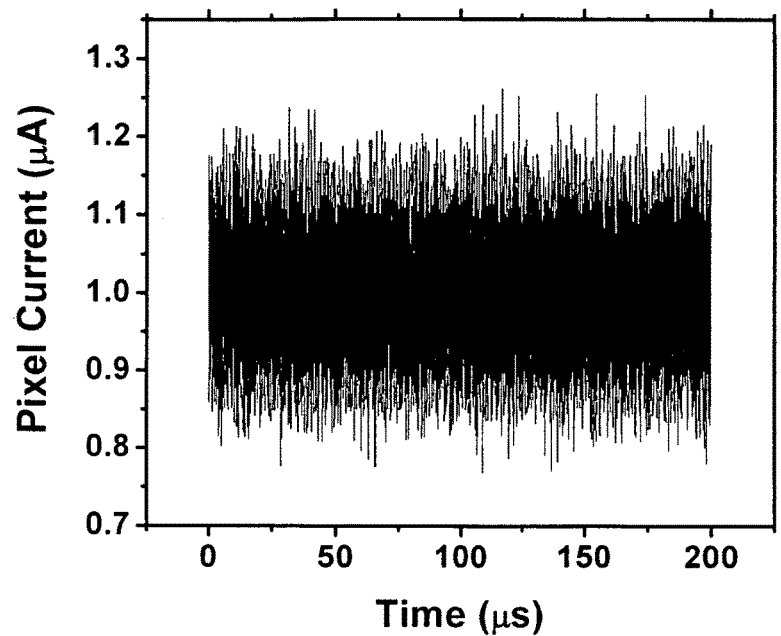
FIG. 10a presents calculated noise when a high-pass filter is used in accordance with an embodiment of the invention.
Figure 10B:
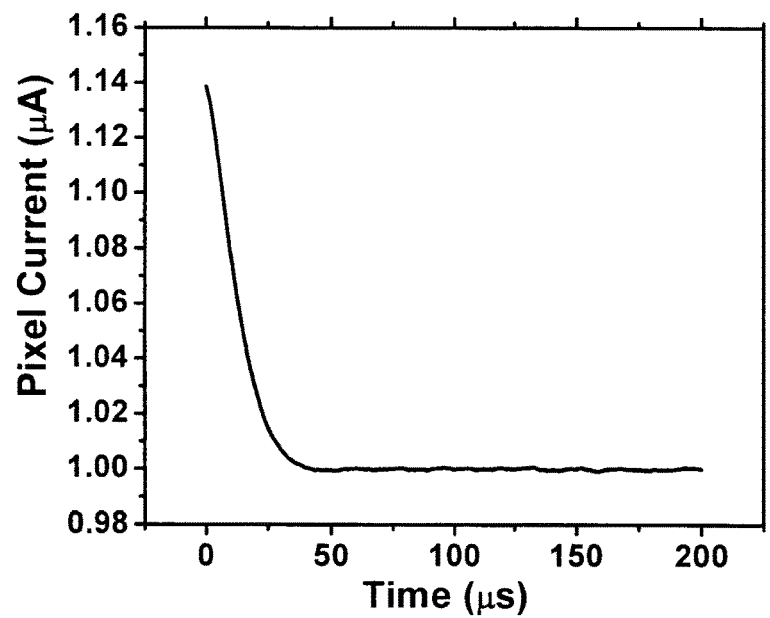
FIG. 10b presents calculated noise when a low-pass filter is used in accordance with an embodiment of the invention.

FIG. 10a presents a graph of pixel current over time during the programming cycle when a differentiator or high-pass filter is used. The noise of the line is fed back to the current through the differentiator. This causes the noise to be amplified. Moreover, it can make the driver unstable since the differentiator is highly sensitive to high frequency signals. As is apparent from this graph the noise of the line is amplified and destroys the signal. FIG. 10b presents a graph of pixel current over time during the programming cycle when a low-pass filter is used. The reduced noise is readily apparent when FIG. 10b is compared to FIG. 10a.

The present invention has been described with regard to one or more embodiments. However, it will be apparent to persons skilled in the art that a number of variations and modifications can be made without departing from the scope of the invention as defined in the claims.

What is claimed is:

1. A driving circuit for improving a settling time of current for a current programmed pixel, the current programmed pixel having a light emitting device, the light emitting device being current programmed, the driving circuit comprising:
    a data line coupled to the current programmed pixel, for controlling the light emitting device;
    a programmable current source for providing via the data line programming current to the current programmed pixel during a programming cycle; and
    a positive feedback loop coupled to the data line including:
        a first capacitor directly coupled to a node, the first capacitor acting as a low pass filter to mitigate high frequency noise, a node voltage of the node following a voltage of the data line;
        a second capacitor directly coupled to the node, the second capacitor differentiating the node voltage generating a first current; and
        a current mirror coupled to the node, the current mirror duplicating the first current and adding the duplicated first current to the programming current.

2. A driving circuit for improving a settling time of current for a current programmed pixel having a light emitting device, the light emitting device being current programmed, the driving circuit comprising:
    a data line coupled to the current programmed pixel, for controlling the light emitting device;
    a capacitor directly coupled to a node, a node voltage of the node following a voltage of the data line, the capacitor differentiating the node voltage generating a first current;
    a programmable current source for providing via the data line programming current to the current programmed pixel during a programming cycle; and
    a current mirror coupled to the node, the current mirror duplicating the first current and adding the duplicated first current to the programming current.

3. The driving circuit according to claim 2 wherein the light emitting device is an organic light emitting diode.

4. The driving circuit according to claim 2, wherein an illumination of the light emitting device is responsive to the programming current provided by the data line.

5. The driving circuit according to claim 2, wherein the light emitting device is controlled by a thin film transistor.

6. A display having an array of pixels each including an organic light emitting diode driven by the driving circuit according to claim 2.

7. A method of improving a settling time of current for a current programmed pixel having a light emitting device in a display, the light emitting device being current programmed, the method comprising steps of:
   providing, during a programming cycle from a programmable current source, programming current via a data line to a current-programmed pixel;
   in a positive feedback loop, differentiating a node voltage of a node generating a first current, the node voltage following a voltage of the data line;
   low pass filtering the node voltage; and
   duplicating the first current and adding the duplicated first current to the programming current.

8. The method according to claim 7, wherein the light emitting device is an organic light emitting diode.

* * * * *